Figure 1:
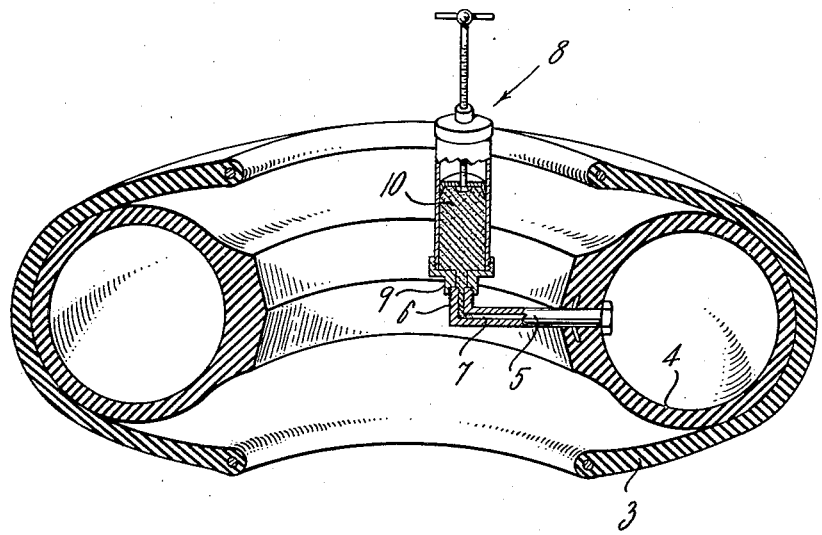

March 6, 1945. A. H. CRANDALL 2,371,029
METHOD OF SEALING INFLATABLE ARTICLES
Filed Jan. 28, 1944

INVENTOR.
ALGIER H. CRANDALL
BY
ATTORNEY

Patented Mar. 6, 1945

2,371,029

UNITED STATES PATENT OFFICE 2,371,029

METHOD OF SEALING INFLATABLE ARTICLES

Algier H. Crandall, Grosse Pointe Woods, Mich., assignor to United States Rubber Company, New York, N. Y., a corporation of New Jersey Application January 28, 1944, Serial No. 520,035

4 Claims. (Cl. 18—53)

This invention relates to shaping of articles, and in particular it relates to sealing inflatable curing bags used for shaping pneumatic tires as a preliminary step to the vulcanizing process.

In the manufacture of pneumatic tires it is customary practice to insert a curing bag within a pneumatic tire as a container for retaining fluid under pressure as required in the vulcanizing operation. Many pneumatic tires are built as a flat band and are subsequently formed to approximately tire shape. Curing bags are inserted into the shaped tire casings immediately after the casing is shaped. Thus the curing bag assists the casing in maintaining its tire shape until the assembly is ready to be placed in a vulcanizer. In some cases the curing bags tend to buckle within the tire casing and consequently the casing is not held in its desired shape. Sometimes the buckling of the curing bag is not relieved even after the vulcanizing operation has been completed resulting in permanent defects in the tire casing.

In order to overcome these objections it has been customary practice in certain cases to inflate the curing bag with approximately five pounds pressure directly after the curing bag is placed into the shaped casing. Curing bags are provided with connector stems through which the bag may be inflated, and the method of sealing the connector stem after inflation has presented difficult problems. After a curing bag and tire assembly is placed within a mold and the mold placed into a pot heater for vulcanization it is necessary to attach a conduit to the connector stem of the curing bag through which steam or hot water is injected into the curing bag. If a valve or cap is used to seal the initial air pressure within the curing bag it is necessary to remove such cap or open such valve before a connection is made with the curing bag connector. Such an operation allows the curing bag to deflate. It is desirable that the curing bag should not deflate because buckling of the bag is resumed and subsequently reinflation after the casing is in the mold will not eliminate entirely the buckling condition.

In accordance with the practice of my invention after the curing bags receive the initial inflation of approximately five pounds pressure, sealing of the connector stem is effected by injecting a quantity of water soluble wax into the connector stem. The wax adheres sufficiently to the walls of the connector stem so as to retain the relatively low pressure within the curing bag. The wax is allowed to remain in the connector stem and the stem is connected to a conduit through which steam or hot water passes to the connector stem. After the assembly is placed in a pot heater the conduit is opened to allow steam or hot water to contact the sealing wax within the connector stem. The elevated temperature of the steam or hot water is sufficient to melt or loosen the wax and the pressure of the steam or hot water forces the wax into the interior of the curing bag. In this manner the curing bag is not deflated at any stage of its operation, and the pressure within the curing bag is increased to approximately 120 pounds to 200 pounds in accordance with the vulcanizing practices.

Figure 2:
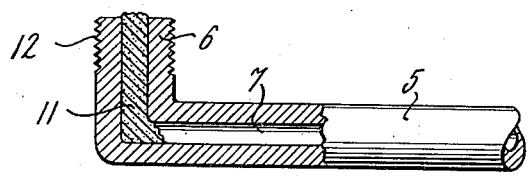

It is therefore among the objects of my invention to provide a method of shaping articles preliminary to vulcanization by maintaining a pressure within the curing bag throughout a period between the shaping and vulcanizing operations; to provide means for sealing connector stems for curing bags in which the seal is automatically opened upon commencement of the vulcanization process; to provide a sealing means for curing bag connector stems which is soluble in water and has no detrimental effect on curing bags; to provide a sealing means for connector stems in the form of a water soluble wax which may be subsequently removed from the curing bag when water is drained from the curing bag; and, to provide an efficient and economical means for maintaining pressure within the curing bag from the time the curing bag is inserted into a tire casing until the vulcanizing operation takes place. These and other objects and advantages will appear more fully in the following detailed description when considered in connection with the following drawing, in which:

Fig. 1 is a perspective view, in section, of an assembled curing bag and tire casing and illustrates the method of injecting wax into a curing bag connector stem; and, Fig. 2 is a side elevational view, partly in section, of a curing bag connector stem.

With reference to the drawing, and in particular to Fig. 1, I show a partially shaped pneumatic tire casing 3 within which has been inserted a conventional curing bag 4. Attached to the curing bag is a connector stem 5 having a right angle portion 6. An aperture 7 extends through the connector stem.

The tire 3 is usually built on a flat drum and is subsequently shaped to the position illustrated in Fig. 1 by conventional tire shaping apparatus. While the tire 3 is held in the shape illustrated by the shaping apparatus the curing bag 4 is inserted into the tire casing. When a tire casing has been shaped as illustrated there are considerable strains in the casing which tend to return the casing to its original flat band shape. For this reason the curing bag 4 is immediately placed within the casing, and to counteract the strains within the tire casing the curing bag is inflated with air in the order of five pounds pressure. Immediately after the curing bag is inflated a plunger type hand operated gun 8 having a fitting 9 adapted for engagement with the connector stem 6 is placed over the open end of the connector stem. The gun 8 contains a quantity of wax 10, and a small quantity of wax 11 is forced into the aperture 7 of the connector stem, as illustrated in Fig. 2.

The wax 10 is water soluble and consists essentially of polymerized ethylene oxide. A material of this kind is available commercially under the name of "Carbowax." In order to obtain the proper consistency of the wax so that it will form a stiff paste it may be desirable to thin the wax with triethylene glycol.

Before the wax is injected into the connector stem it is desirable that the connector stem should be reduced to approximately normal room temperature in order that the wax will not melt as it contacts the walls of the connector stem. In other words, a hot curing bag taken from a vulcanizer should not be used immediately unless the stem has been cooled because the wax under such conditions will not adhere properly to the walls of the connector stem aperture. When the connector stem has been thus sealed the hand gun 8 is removed and the assembly is also removed from the shaping apparatus. Thereafter the tire and curing bag assembly may be stored until it is ready to be placed in a vulcanizer. It is sometimes desirable to allow a period of time to elapse between the shaping and vulcanizing operations so that the inflated curing bag will allow the strains in the tire casing to become dissipated. A period of approximately one hour is considered satisfactory for this purpose.

When the curing bag and tire assembly is placed in a vulcanizing mold, a conventional conduit supplying hot water or steam is fastened onto the threaded portion 12 of the connector stem 6. No further operation is necessary, except to follow the conventional practice of vulcanization. In such case hot water or steam is turned on at the proper time and the hot fluid coupled with a relatively high pressure is sufficient to loosen the wax 11. The wax 11 is therefore forced through the aperture 7 of the connector stem and into the interior of the curing bag 4. Even though steam were exclusively used within a curing bag there is sufficient condensation forming a quantity of water within the curing bag to absorb the small quantity of water soluble wax 11. The wax which is dissolved in the water within the curing bag is removed from the curing bag at such time as the water is removed from the bag in a subsequent operation.

As thus described it is believed apparent that I have provided a novel method whereby a seal can be provided in curing bag connector stems and removed automatically without reducing the initial pressure within the curing bag. While I have shown and described a preferred embodiment of my invention it is to be understood that it is susceptible of modifications which appear obviously within the spirit of the invention and as appearing in the scope of the appended claims.

Having thus described my invention what I claim and desire to protect by Letters Patent is:

1. The method of shaping articles preliminary to vulcanization comprising the steps of inserting a curing bag in the article to be shaped, inflating the curing bag through a connector stem, and injecting wax into the connector stem to provide a temporary seal for retaining compressed air within the curing bag.

2. The method of shaping articles preliminary to vulcanization comprising the steps of inserting a curing bag in the article to be shaped, inflating the curing bag through a connector stem, and injecting a water soluble wax into the connector stem to provide a temporary seal for retaining compressed air within the curing bag.

3. The method of shaping articles preliminary to vulcanization comprising the steps of inserting a curing bag in the article to be shaped, inflating the curing bag through a connector stem, injecting a water soluble wax into the connector stem to provide a temporary seal for retaining compressed air within the curing bag, and subsequently removing the wax by forcing it into the curing bag by applying fluid pressure to the connector stem.

4. The method of shaping articles preliminary to vulcanization comprising the steps of inserting a curing bag in the article to be shaped, inflating the curing bag through a connector stem, injecting a water soluble wax into the connector stem to provide a temporary seal for retaining compressed air with the curing bag, and subsequently removing the wax by introducing hot fluid through the connector stem.

ALGIER H. CRANDALL.